United States Patent
Vernon et al.

(10) Patent No.: US 8,575,296 B2
(45) Date of Patent: Nov. 5, 2013

(54) POLYESTER ARTICLES HAVING SIMULATED METALLIC OR PEARLESCENT APPEARANCE

(75) Inventors: Gary Vernon, Sugar Hill, GA (US); David Rosendale, Bay Village, OH (US)

(73) Assignee: PolyOne Corporation, Avon Lake, OH (US)

( * ) Notice: Subject to any disclaimer, the term of this patent is extended or adjusted under 35 U.S.C. 154(b) by 0 days.

(21) Appl. No.: 13/394,513

(22) PCT Filed: Sep. 29, 2009

(86) PCT No.: PCT/US2009/058812
§ 371 (c)(1),
(2), (4) Date: Mar. 6, 2012

(87) PCT Pub. No.: WO2011/040905
PCT Pub. Date: Apr. 7, 2011

(65) Prior Publication Data
US 2012/0165422 A1   Jun. 28, 2012

(51) Int. Cl.
*C08G 63/00* (2006.01)
*C08G 63/02* (2006.01)

(52) U.S. Cl.
USPC ............ 528/190; 521/138; 524/445; 524/502

(58) Field of Classification Search
USPC .................................. 521/138; 524/445, 502
See application file for complete search history.

(56) References Cited

U.S. PATENT DOCUMENTS

| | | |
|---|---|---|
| 3,515,626 A | 6/1970 | Duffield et al. |
| 4,368,295 A | 1/1983 | Newton et al. |
| 4,615,941 A | 10/1986 | Lu |
| 4,771,108 A | 9/1988 | Mackenzie |
| 4,842,208 A | 6/1989 | Kitamura |
| 5,763,077 A | 6/1998 | Inamura |
| 5,811,493 A | 9/1998 | Kent |
| 5,945,055 A | 8/1999 | Inamura |
| 6,999,234 B2 | 2/2006 | Hiraishi et al. |

FOREIGN PATENT DOCUMENTS

| | | |
|---|---|---|
| EP | 0522174 | 1/1993 |
| JP | H08-176330 | 7/1996 |
| WO | 2008/116797 | 10/2008 |

*Primary Examiner* — Terressa Boykin
(74) *Attorney, Agent, or Firm* — John H. Hornickel

(57) ABSTRACT

A polyester article is made to appear lustrously metallic or pearlescent by the addition of polymethylpentene and non-metallic, non-pearlescent colorant; and optionally other functional additives. The colorant can be one or more pigments, one or more dyes, or combination thereof. A stretch blow molded plastic article, such as a bottle, using the polymethylpentene in the polyester can simulate the appearance of a metallic surface or a pearlescent luster even though non-metallic and non-pearlescent colorants are used.

20 Claims, 9 Drawing Sheets

POLYESTER ARTICLES HAVING SIMULATED METALLIC OR PEARLESCENT APPEARANCE

FIELD OF THE INVENTION

This invention relates to use of a polymer and colorant combination to simulate metallic or pearlescent appearance in a colored polyester article.

COLOR DRAWING

The Patent Cooperation Treaty does not permit color drawings. For a view of FIGS. 10-18 in color, please contact the attorney of record to obtain a copy of them.

BACKGROUND OF THE INVENTION

Plastic has taken the place of other materials in a variety of industries. In the packaging industry, plastic has replaced glass to minimize breakage, reduce weight, and reduce energy consumed in manufacturing and transport. In other industries, plastic has replaced metal to minimize corrosion, reduce weight, and provide color-in-bulk products.

Attracting consumers to purchase individually-sized or family-sized containers includes branding and trade dress. Among the elements of valuable trade dress is the color of the container. Moreover, such color may need to co-exist with translucency, transparency, or other special effects for the bottle, such as metallic or pearlescent appearance.

Modern consumer products demand eye-catching attention. Producers of consumer products compete for available shelf space in retail businesses. The outer appearance of a product, including its shape, color, texture, and labeling is the first impression for a consumer. Producers undertake considerable efforts to display a desired appearance to attract the consumer to the product. Such outer appearance, over time and with exclusivity, achieves a form of intellectual property for the producer, called trade dress, which offers a visual differentiation for commodity products and another differentiation for unique products.

Thermoplastic resins are used for the production of consumer products. Ranging from the clear, plastic, large soft drink bottles to the miniature colored cosmetic vials, polyethylene terephthalate (PET and one type of the class of polymers called polyesters) as a resin has been frequently used because of its low cost and ability to be compounded with colorants. Most importantly, polyesters such as PET can be formed into products by conventional blow-molding techniques. Molded products made by the blow-molding techniques take the shape and outer texture according to the mold used.

Films have previously included polyolefins in transparent polyesters to impart translucency or opacity, including such as disclosed in U.S. Pat. No. 4,368,295 (Newton et al.). But Newton et al. did not address use of polyesters and polyolefins in colored polymeric films.

SUMMARY OF THE INVENTION

Metallic colorants can be supplied in the form of concentrates formulated to give a brushed-metal look to thermoplastic parts. These concentrates (also called "masterbatches"), upon blending into the thermoplastic resin, allow the plastic article to duplicate the look of brushed metals such as aluminum, bronze, copper, gold or antique brass. Custom metal color matches also can be formulated, depending on the colorant combination employed. The concentrates are supplied in a pelletized, non-dusting form tailored to a specific resin system. A typical dilution or "letdown" ratio for a metallic colorant concentrate ranges from about 100:1 to about 10:1 and preferably about 25:1 (4%), which varies with the desired effect. Typical applications for metallic effect plastic articles include packaging, personal care, toys, sporting goods, and transportation.

Pearlescent colorants can be supplied in the form concentrates formulated to give a lustrous effect varying from a satin to a sparkling sheen using pearlescent or iridescent pigments. The pearlescent colorant concentrates can be formulated in a range of hues and are compatible with most thermoplastic resins. Effects range from satin to sparkle. The strongest pearlescent effects are seen in pastel colors. As with metallic colorant concentrates, pearlescent colorant concentrates are supplied in pelletized, non-dusting form, tailored to suit a specific resin system. Again, a typical letdown ratio ranges from about 100:1 to about 10:1 and preferably about 25:1 (4%), which varies with the desired effect. Pearlescent effect plastic articles can have the same or different uses as metallic effect plastic articles.

Commercially available concentrates used to generate a metallic or pearlescent effect in the coloration of a polyester article are OnColor™ FX colorant concentrates from PolyOne Corporation of Avon Lake, Ohio, USA.

In the case of both metallic and pearlescent colorant concentrates, the colorant which provides the special effect can be viewed by a customer as costly because conventional colorants used to produce metallic or pearlescent appearance are higher in specific gravity and have a tendency to produce unsightly flow-lines due to the flake geometry of the conventional metallic or pearlescent colorant material. Furthermore, when subjected to shear stresses the conventional metallic or pearlescent colorant materials can bend or break, thus changing the overall surface appearance of the thermoplastic article in its final shape. In addition, many of the conventional metallic or pearlescent colorant materials are not able to produce a highly uniform pearl-like appearance—the flakes produce a grain-like appearance which may be undesirable to the customer.

The present invention solves the problem in the art by using polymethylpentene polymer (PMP) as a component or carrier for color concentrates for polyester articles, in order to simulate metallic or pearlescent effects in the coloration of a polyester article when the polyester article is produced by stretch blow molding or other stress formation process. As previously reported, the interaction of PMP in polyester results in increasing translucency toward opacity. But totally unexpectedly, that increasing translucency toward opacity is accompanied by a simulation by the non-metallic, non-pearlescent colorants of the brushed metal appearance of a metallic colorant concentrate or the lustrous appearance of a pearlescent colorant concentrate, or both. More precisely, the chromaticity and the brightness of the resulting molded polyester container using concentrates of the present invention have dramatically different values as one tilts the container in the presence of a light source at a constant angle.

For purposes of the present invention, "non-metallic, non-pearlescent colorant" means a conventional dye or pigment which is not formed of, or derived from, metal, mica, or glass.

Unpredictably, a conventional, non-metallic, non-pearlescent colorant can replace more expensive and more dispersion-difficult metallic colorants or pearlescent colorants, if one employs PMP as a carrier for the colorant being employed in a polyester plastic article. It is believed with current costs that the combination of PMP and non-metallic, non-pearlescent colorant is less expensive than the use of a metallic or pearlescent colorant.

One aspect of the invention is a plastic article, comprising (a) a matrix of polyester and (b) polymethylpentene dispersed throughout the matrix, and (c) at least one non-metallic, non-pearlescent colorant dispersed throughout the matrix, wherein surfaces of the article have a brightness and chromaticity which simulates the appearance of metallic pigment or pearlescent pigment throughout the matrix because the brightness and chromaticity values change as the angle of the surface of the article changes relative to a constant light source.

Another aspect of the invention is a method of making the plastic article described above, comprising the steps of (a) mixing the matrix and the concentrate into a mixture; and (b) forming under stress the mixture into the plastic article, wherein the differences in brightness and chromaticity are a function of the amount of polymethylpentene in the mixture and the stretch ratio to reduce wall thickness during the stretch blow molding step.

Features will become apparent from a description of the embodiments of the invention.

EMBODIMENTS OF THE INVENTION

Polyester

Figure 1:
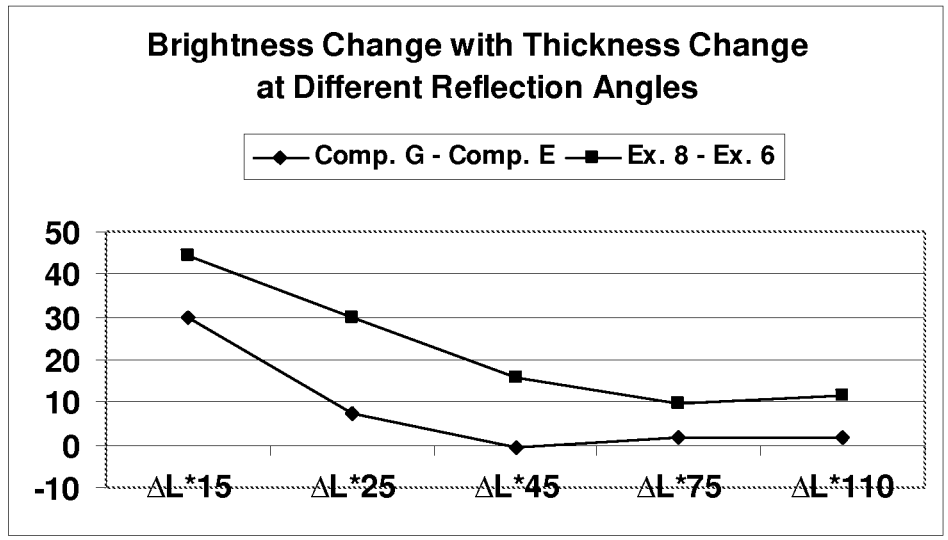
FIG. 1 is a graph of brightness change with thickness change at different reflection angles for one pair of Comparison Examples and for one pair of Examples.

Any polyester is a candidate for use in the present invention. The formation of a polyester from a monool or a polyol and an acid or its ester encompasses many different suitable types of polyesters for use in this invention. The monomeric units can be formed reactions of either aliphatic moieties, aromatic moieties, or both. Desirably, the polyester is transparent or semi-transparent in order to accentuate the effect of the stress forming event.

Non-limiting examples of polyesters include terephthalates, terephthalate glycols, lactides, (hydroxy)alkanoates, copolyesters of terephthalic acid residues, 2,2,4,4-tetramethyl-1,3-cyclobutanediol, and 1,4-cyclohexanedimethanol, etc., or combinations thereof.

Additionally, one can use homopolyesters or copolyesters, such as homopolymers and copolymers of terephthalic acid and isophthalic acid. The linear polyesters may be produced by condensing one or more dicarboxylic acids or a lower alkyl diester thereof, e.g., dimethylterephthalate, terephthalic acid, isophthalic acid, phthalic acid, 2,5-, 2,6-, or 2,7-naphthalene dicarboxylic acid, succinic acid, sebacic acid, adipic acid, azelaic acid, bibenzoic acid and hexahydroterephthalic acid, or bis-p-carboxyphenoxyethane, with one or more glycols, e.g., ethylene glycol, pentyl glycol, and 1,4-cyclohexanedimethanol.

Of these various polyester candidates, because of commercial availability, the terephthalates, such as polyethylene terephthalate (PET) or polybutylene terephthalate (PBT), the lactides, such as polylactic acid (PLA), and the hydroxyalkanoates, such as polyhydroxybutyrate (PHB) or polyhydroxybutyrate-co-valerate (PHBV), are desirable for use. PET is currently preferred because of its ubiquity and cost, although PLA and PHBV are emerging as bio-derived thermoplastic polyesters which can supplant PET in whole or in part in certain markets.

Polymethylpentene

At least a portion of the plastic polyester article needs to include PMP. Generally, PMP is 4-methylpentene-1 based polyolefin having a formula I:

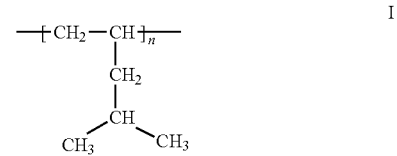

in which n is high enough (e.g., at least 30) for the polymer to have a number average molecular weight higher than the number average molecular weight of an oligomer. The monomeric unit can homopolymerize or copolymerize, such as with a lower carbon alkylene. PMP has a melting point of about 240° C. and is nearly transparent with a low specific gravity of about 0.83 g/cm$^3$. The reported haze is less than 1% with a transmittance of more than 90%. PMP has a refractive index of 1.46.

Often, PMP is used in the personal care industry as clear caps and tubes for medicaments and personal hygiene products. For that reason, PMP has been used as a carrier in color concentrate products, but not intentionally for use with polyester for metallic or pearlescent simulation appearance purposes.

PMP is commercially available from Mitsui Chemicals America, Inc. of Rye Brook, N.Y., USA.

Mitsui teaches away from using PMP itself in a blow molding process, calling it "impossible" in one item of its technical literature. One having ordinary skill in the art would find it counterintuitive to use PMP, which has low haze and high transmittance, to be used in any blow molding process, and especially in a polyester blow molding process which results in a nearly opaque polyester article.

Colorant

A colorant can be a pigment, a dye, a combination of pigments, a combination of dyes, a combination of pigments and dye, a combination of pigment and dyes, or a combination of pigments and dyes. The choice of colorants depends on the ultimate color desired by the designer for the plastic article.

The science of color is well known to those skilled in the art. Without undue experimentation, one can use color matching techniques to identify a particular location in spherical color space. For example, one skilled in the art can use the teachings of PCT Patent Publication WO/2004/095319 to digitally map color space using specific polymer carriers and colorants as raw material ingredients. Alternatively, one can make small samples called plaques for visual review.

Colorants are commercially available from a number of sources well known to those skilled in the art. Commercially available pigments are well known to those skilled in the art and include organic and inorganic colorant chemistries. Commercially available dyes are well known to those skilled in the art and include all organic chemistries. Commercial sources for pigments and dyes include multinational companies such as BASF, Bayer, Color-Chem International, Sun Chemical, Zhuhai Skyhigh Chemicals, and others identified at Internet Web Sites such as http://www.colorpro.com/info/vendors/colorant.html and http://dir.yahoo.com/Business_and_Economy/Business_to_Business/Chemicals_and_Allied_Products/Pigments_and_Dyes/

Table 1 lists 8 commercially available pigment colorants in a variety of primary and secondary colors, 5 chromatics, 2 blacks, and 1 white.

TABLE 1

Commercial Pigment Colorants

| Raw Material Name | CI_Name | Family | COLOR | FDA* |
|---|---|---|---|---|
| TIOXIDE R-FC6 WHITE | PIGMENT WHITE 6 | INORGANIC | WHITE | Y |
| REGAL 660R BLACK POWDER | PIGMENT BLACK 7 | ORGANIC | | N |
| MPC CHANNEL BLACK | PIGMENT BLACK 7 | ORGANIC | | Y |
| HELIOGEN BLUE K7090 | PIGMENT BLUE 15:3 | ORGANIC | BLUE | Y |
| Heliogen Blue K6903 | PIGMENT BLUE B 15:1 | ORGANIC | BLUE | Y |
| 34L2000 AZURE BLUE | PIGMENT BLUE 28 | INORGANIC | BLUE | Y |
| SICOTAN YELLOW K 2001 FG | PIGMENT BROWN 24 | INORGANIC | YELLOW | Y |
| SICOTAN YELLOW K 1011 | PIGMENT YELLOW 53 | INORGANIC | YELLOW | Y |

* As publicized by the commercial producer or as tested by the applicant, or both.

Table 2 shows 14 commercially available dyes.

TABLE 2

Commercial Dye Colorants

| Raw Material Name | CI Name | Family | Color | FDA* |
|---|---|---|---|---|
| Lambdaplast Blue NL | Solvent Blue 59 | Anthraquinone | Blue | N |
| Macrolex Blue RR Granular | Solvent Blue 97 | Anthraquinone | Blue | N |
| Macrolex Green G Granular | Solvent Green 28 | Anthraquinone | Green | N |
| Macrolex Green 5B Granular | Solvent Green 3 | Anthraquinone | Green | N |
| Macrolex Orange R Granular | Disperse Orange 47 | Polymethine | Orange | N |
| Macrolex Orange 3G Granular | Solvent Orange 60 | Perinone | Orange | N |
| Macrolex Red EG Granular | Solvent Red 135 | Perinone | Red | N |
| Macrolex Red E2G Granular | Solvent Red 179 | Perinone | Red | N |
| Thermoplast Red 454 | Solvent Red 195 | Anthraquinone | Red | N |
| Macrolex Red Violet R Granular | Disperse Violet 26 | Anthraquinone | Violet | N |
| Macrolex Violet B Granular | Solvent Violet 13 | Anthraquinone | Violet | N |
| Macrolex Violet 3R Granular | Solvent Violet 36 | Anthraquinone | Violet | N |
| Key Plast Yellow 3G | Solvent Yellow 93 | Pyrazolone | Yellow | N |
| Key Plast Yellow AG | Solvent Yellow 114 | Quinophthalone | Yellow | N |

* As publicized by the commercial producer or as tested by the applicant, or both.

Colorants for this invention can include colorants intended for transparent or translucent plastic polyester articles and colorants intended for opaque plastic articles. The colorant itself in this invention determines the color of the metal or pearl which is simulated by the interaction of the PMP with the polyester.

Achievement of a color match of a plaque with a desired color from the creativity of a designer or a pre-arranged color standard such as Pantone® color standards from an inventory of commercially available colorants is relatively straightforward for a skilled color matcher, even if a few iterations are required to satisfy the customer.

Though the more convenient method of manufacture is to assemble the colorant and PMP as a concentrate to be added into the polyester matrix, it is certainly contemplated that each ingredient can be added separately. Significantly, the amount of PMP in the polyester affects the change in brightness and chromaticity of the colorants as the wall thickness of the polyester article changes from a preform to a final article. The simulated metallic or pearlescent surface appearance can be achieved using this invention, whether by compounding all ingredients together or compounding a concentrate of colorant and PMP into polyester.

When making a concentrate, the concentration of colorant into a carrier is significant because of the relative cost of the colorant ingredient(s) and the need for that color to consistently and precisely mix and disperse into the carrier and then to consistently and precisely dilute into the plastic resin and other compound ingredients during "letdown" of the concentrate in mixing equipment prior to formation of the preform embryonic bottles or other articles. Letdown ratios depend on the concentration of colorant in the color concentrate and whether the final molded product is intended to be opaque, translucent, or transparent.

The amount of PMP in the final molded product, as a function of plastic article (e.g., polyester part) wall thickness can range from about 0.1 to about 2 weight percent, and preferably from about 0.25 to about 1.5 weight percent for plastic article having a wall thickness ranging from about 0.1 to about 2.5 mm in thickness.

Stated another way, the ratio of weight percentage of PMP to plastic article wall thickness in mm can range from about 0.04%:1 mm to about 20%:1 mm and preferably from about 0.5%:1 mm to about 15%:1 mm and even more preferably from about 1%:1 mm to about 10%:1 mm.

Without undue experimentation but using the examples of the invention later, a person having ordinary skill in the art can adjust the amount of PMP relative to polyester part wall thickness to tailor the amount of simulate metallic or pearlescent appearance.

The mixing equipment used to make the color concentrate can be any suitable equipment already used in the art of mixing highly concentrated solids. For example, such equipment includes high speed Henschel mixers, ribbon blenders, shakers, and the like.

Mixing equipment can operate at mixing speeds ranging from about 10 rpm to about 10,000 rpm, and preferably from about 500 to about 8000 rpm. Mixing equipment can operate at temperatures ranging from about 25° C. to about 100° C., and preferably from about 40° C. to about 80° C.

Advantageously, one need not dry nor recrystallize the concentrate of PMP and colorant before use with the polyester matrix.

Optional Functional Additives

Additives to improve processing or performance of the concentrate of the present invention or the polyester compound, or both, can be added according to preferences of those skilled in the art. For example, functional additives for polyester bottles can include anti-oxidants, anti-stats, acetaldehyde scavengers, oxygen scavengers, blowing agents, biocides, exfoliated nanoclays, thickeners, and the like, and combinations thereof. Generally, minor amounts of such additives provide improvement of performance to the color concentrate during processing with the other ingredients in the polyester resin or in performance of the polyester molded article after manufacturing. One skilled in the art without undue experimentation can determine the appropriate concentration.

Frequently, the preparation of a colored plastic article does not involve merely color but also special effect features, such as Granite, Translucent, Fluorescents, Iridescents, Marbles, Metallics, Pearls, etc. With metallics and pearls already simulated by use of the PMP color concentrate in polyester, these other special effects can be added to create even more eye-catching effects for the plastic article in use or on sale.

Non-limiting examples of such additives are commercially available from PolyOne Corporation of Avon Lake, Ohio, USA (www.polyone.com) and marketed under the following brands: OnColor FX colorants, PolyOne colorants, etc.

Plastic articles exposed to natural sunlight are exposed to ultraviolet rays that can harm the color of the article. Therefore, for certain applications, it is customary but not required to include ultraviolet light stabilizers in the color concentrate. This optional additive being included in the color concentrate adds value to that concentrate as a masterbatch in polymer compounding because the ultraviolet stabilizer also helps protect the polymer resin from adverse effects arising from exposure to the ultraviolet rays. Being included in a masterbatch as an additive makes the introduction of the stabilizer easier, due to better dispersion.

Table 3 shows the acceptable, desirable and preferred weight percents of ingredients for color concentrates of the present invention.

TABLE 3

| Ingredient (Wt. %) | Acceptable Range | Desirable Range | Preferred Range |
| --- | --- | --- | --- |
| Carrier | 15-99.99% | 20-99.5% | 60-98% |
| Colorant | 0.01-75% | 0.5-60% | 2-40% |
| Optional Functional Additives | 0-30% | 0-20% | 0-10% |

The carrier can be entirely PMP or a mixture of PMP and polyester depending on the amount of total PMP desired in the polyester part wall thickness, according to the 0.04%/mm-20%/mm range identified above.

USEFULNESS OF THE INVENTION

Color concentrates of the present invention can be letdown into plastic resins and other ingredients useful for making molded or extruded articles.

As stated previously, the plastic resins can be any polyester, but especially PET.

The invention has particular applicability to plastic articles which are personal care or hygiene product containers, such as shampoo bottles, lotion containers, etc. The method of making such plastic articles is via stretch blow molding.

Stretch blow molding is a subset of conventional blow molding, often used in making containers. The final shape is achieved via one stage or two stages.

In a one stage blow molding, a "parison" is formed having some final dimensions (the "finish" such as the screw cap portion of the ultimate container) and nearly immediately then subjected to blow molding with a deliberate stretch of the non-final dimensions expanded to their intended shape. Depending on the design, the stretching occurs both in the axial direction of the parison and in the hoop or radial direction also.

In a two stage blow molding, a "preform" is formed via conventional injection molding and having some final dimensions (the "finish" such as the screw cap portion of the ultimate container) and the remainder having shrunken dimensions for convenience of transport and storage until final stress formation.

In the second stage, the preform is heated to an appropriate softening temperature and gas is used to deliberately stretch to its final intended shape. Depending on the design, the stretching occurs both in the axial direction of the preform and in the hoop or radial direction also.

The amount of deliberate stretching force applied, measured by the reduction in thickness in the preform to the final part can be described as the stretch ratio: wall thickness of preform divided by wall thickness of part.

The compound of PMP, non-metallic, non-pearlescent colorant and polyester can be molded into a final container while undergoing expansion at stretch ratios ranging from about 1.5:1 to about 200:1, and preferably from about 3:1 to about 50:1.

Also, the length of the preform usually expands during blow molding to a final part length about 1:1 to about 200:1. For the examples, which follow, that longitudinal or axial expansion ratio is about 2:1.

Heated air is usually used in the stretch blow molding process, although other gases can be used.

It is known that polyester can be strengthened by stretch blow molding because the resulting strain is hardened into the plastic article after cooling. This strengthening in a container can assist in the storage of fluids having a high vapor pressure, such as carbonated soft drinks and the like.

The plastic article (of polyester and PMP which are both polymers having high clarity approaching transparency) becomes translucent or even opaque. The ability of standard colorants to simulate metallic pigments or pearl pigments is totally unexpected but arises from the use of PMP and the effect of stress formation into final polyester article shape. Other embodiments appear in the examples.

EXAMPLES

Table 4 shows the ingredients used for the two examples of the invention and the comparative example.

TABLE 4

| Brand and Grade | Ingredient Name | Purpose | Source (Company and Location) |
| --- | --- | --- | --- |
| EN 001 | Polyethylene Terephthalate (PET) | Carrier | Eastman Chemical, Kingsport, TN |
| Maxsperse W3000 | Surfactant Wax | Carrier | PCC Chemax, Inc., Greenville, S.C. |
| TPX RT-18 | Polymethyl Pentene (PMP) | Carrier | Mitsui Chemicals America, Inc., Rye Brook, NY |
| Macrolex Orange 3G Granular | Solvent Orange 60 | Colorant | LanXess, Chardon, Ohio, USA |
| Macrolex Red EG Granular | Solvent Red 135 | Colorant | LanXess, Chardon, Ohio, USA |
| Keyplast Yellow 3G | Solvent Yellow 93 | Colorant | Keystone Aniline Corporation, Chicago, IL |
| Keyplast Blue KR | Blue | Colorant | Keystone Aniline Corporation, Chicago, IL |
| Royal Gold Satin Pearl | Gold Pearl | Pearl Pigment | Merck KGaA, Darmstadt, Germany |
| Iriodin 100 | White Pearl | Pearl Pigment | EMD Merck KGaA |
| R1170 | Carbon Black | Pigment/Gray Scale Contributor | Columbian Chemical, |
| Arosperse F138 | Carbon Black | Pigment/Gray Scale Contributor | Evonik, Parsippany, NJ |
| Tiona RCL4 | Titanium Dioxide | Pigement/Gray Scale Contributor | Millenium Inorganic Chemicals, Hunt Valley, MD |
| Tioxide TR28 | Titanium Dioxide | Pigment/Gray Scale Contributor | Huntsman Chemical, Billingham, England |
| Irganox 1010 | Anti-Oxidant | Stabilizer | Ciba Specialty Chemicals |
| Plaschek 775 | Non-Phthalate Plasticizer | Plasticizer | Ferro Corporation, Cleveland, Ohio |

Table 5 shows the formulations.

TABLE 5

| Ingredient | 1 | A | 2 |
| --- | --- | --- | --- |
| PET Carrier | | | 27.21% |
| PMP Carrier | 93.90% | | 55.26% |
| Wax Carrier | | 66.65% | |
| Macrolex Orange 3G Granular (Orange 60) | | 12.35% | |
| Macrolex Red EG Granular (Red 135) | | 6.18% | 4.62% |
| Keyplast Blue KR | 1.20% | | |
| Keyplast Yellow 3G (Yellow 93) | | | 11.84% |
| Royal Gold Satin Pearl | | 8.15% | |
| White Pearl | | 4.20% | |
| R1170 Carbon Black | 0.70% | | |
| Arosperse F138 | | | 0.07% |
| Tioxide TR28 TiO2 | | 2.47% | |
| Tiona RCL4 TiO2 | 4.00% | | |
| Irganox 1010 | 0.20% | | |
| Plaschek 775 Plasticizer | | | 1.00% |
| | 100.00% | 100.00% | 100.00% |
| Total Colorant | 5.90% | 21.00% | 16.46% |
| Total Pearl Pigments | 0.00% | 12.35% | 0.00% |

Both Examples 1 and 2 were made using a Henschel brand mixer operating at 1000 rpm and at 85° C. for one minute to thoroughly mix the ingredients. Then, the mixture was then extruded at a co-rotating screw extruder at about 285° C. Comparative Example A was made using a Henschel brand mixer operating at 1000 rpm and at 49° C. for one minute to thoroughly mix the ingredients. The mixture is extruded using a single screw extruder at 171° C. and conveyed onto a chilled roll operating at about 10° C. and then fractured into flakes and screened to remove large particles and provide consistent particle size. The different procedure was required because the carrier is a low melting wax.

To prepare Examples 3-11 and Comparative Examples B-J, a percentage of each concentrate was let down into PET by introducing the concentrate into the feeder and the dried PET into a separate feeder of an Aoki stretch blow molding machine to make blow molded bottles having shape of a cylinder with its upper end curving to a screw cap formation. In the first stage of the molding process, a preform having the following dimensions is formed: 3.25 inches (82.55 mm) in length with an average outside diameter of about 0.855 inches (21.72 mm), an average inside diameter of about 0.555 inches (14.09 mm), and a slight taper with a wall thickness constant of 0.15 inches (3.81 mm). In the second state a preform is subjected to blow molding to produce bottles having the following, respective dimensions: all bottles were 6.25 inches (158.75 mm) in length with (a) the smallest bottle having an outside diameter of about 1.1 inches (27.94 mm) and a 0.05 inch (1.27 mm) average wall thickness (b) the medium bottle having an outside diameter of about 1.95 inches (49.53 mm) with a 0.16 inch (4.06 mm) average wall thickness, and (c) the largest bottle having an outside diameter of about 2.75 inches (69.85 mm) with a 0.12 inch (3.05 mm) average wall thickness.

The details appear in Table 6, for each of Examples 3-11 and Comparative Examples B-J. All of Examples 3-11 used the concentrate of Example 2; all of the Comparative Examples B-J used the concentrate of Comparative Example A.

TABLE 6

Part 1

| | Example | | | | | | | | |
|---|---|---|---|---|---|---|---|---|---|
| | B | C | D | 3 | 4 | 5 | E | F | G |
| Bottle Size | Large | Medium | Small | Large | Medium | Small | Large | Medium | Small |
| Sidewall Thickness (mm) | 0.3048 | 0.4064 | 1.27 | 0.3048 | 0.4064 | 1.27 | 0.3048 | 0.4064 | 1.27 |
| Preform Length (mm) | 82.55 | 82.55 | 82.55 | 82.55 | 82.55 | 82.55 | 82.55 | 82.55 | 82.55 |
| Preform Sidewall Thickness (mm) | 3.81 | 3.81 | 3.81 | 3.81 | 3.81 | 3.81 | 3.81 | 3.81 | 3.81 |
| Concentrate Example | A | A | A | 2 | 2 | 2 | A | A | A |
| Concentrate Loading (wt. %) | 0.8 | 0.8 | 0.8 | 1.1 | 1.1 | 1.1 | 1.2 | 1.2 | 1.2 |
| PMP in Sidewall (wt. %) | 0.00 | 0.00 | 0.00 | 0.60 | 0.60 | 0.60 | 0.00 | 0.00 | 0.00 |
| Stretch Ratio (Radial Wall Thickness) | 12.5 | 9.375 | 2.98 | 12.5 | 9.375 | 2.98 | 12.5 | 9.375 | 2.98 |
| Molding Temperature | 307° C. | 307° C. | 307° C. | 307° C. | 307° C. | 307° C. | 307° C. | 307° C. | 307° C. |
| Cycle Time of Molding (secs) | 15 ± 2 | 15 ± 2 | 15 ± 2 | 15 ± 2 | 15 ± 2 | 15 ± 2 | 15 ± 2 | 15 ± 2 | 15 ± 2 |
| Type of Stretch Blow Molding | Two-Stage | Two-Stage | Two-Stage | Two-Stage | Two-Stage | Two-Stage | Two-Stage | Two-Stage | Two-Stage |
| Pressure Range (high-low) (Mpa) | 2.07-1.24 | 2.07-1.24 | 2.07-1.24 | 2.07-1.24 | 2.07-1.24 | 2.07-1.24 | 2.07-1.24 | 2.07-1.24 | 2.07-1.24 |
| Mold Temperature | 10° C. | 10° C. | 10° C. | 10° C. | 10° C. | 10° C. | 10° C. | 10° C. | 10° C. |
| Goniospectrophotometer Measurements from Light at 45° (ASTM D2244) | | | | | | | | | |
| Light Measured at 15° | | | | | | | | | |
| $L^*15°$ | 46.88 | 38.9 | 29.18 | 72.94 | 64.22 | 30.17 | 68.94 | 60.24 | 39.25 |
| $a^*15°$ | 23.67 | 31.25 | 32.66 | 14.44 | 16.15 | 26.38 | 25.72 | 29.57 | 33.87 |
| $b^*15°$ | 26.08 | 34.28 | 30.41 | 51.61 | 40.54 | 31.76 | 22.59 | 26.21 | 29.42 |
| $C15°$ | 35.2 | 46.4 | 44.6 | 53.6 | 43.6 | 41.3 | 34.2 | 39.5 | 44.9 |
| $\Delta C15°$ | −9.4 | 1.8 | | 12.3 | 2.4 | | −10.6 | −5.3 | |
| $\Delta L^*15°$ | 17.7 | 9.72 | | 42.77 | 34.05 | | 29.69 | 20.99 | |
| Light Measured at 25° | | | | | | | | | |
| $L^*25°$ | 31.33 | 29.8 | 25.2 | 52.74 | 52.19 | 25.44 | 38.75 | 37.14 | 31.27 |
| $a^*25°$ | 23.38 | 29.3 | 33.1 | 15.04 | 18 | 27.16 | 27.55 | 30.88 | 35.4 |
| $b^*25°$ | 26.08 | 32.2 | 31.3 | 45.54 | 42.55 | 33.9 | 28.06 | 31.16 | 32.84 |
| $C25°$ | 35.0 | 43.5 | 45.6 | 48.0 | 46.2 | 43.4 | 39.3 | 43.9 | 48.3 |
| $\Delta C25°$ | −10.5 | −2.0 | | 4.5 | 2.8 | | −9.0 | −4.4 | |
| $\Delta L^*25°$ | 6.13 | 4.6 | | 27.3 | 26.75 | | 7.48 | 5.87 | |
| Light Measured at 45° | | | | | | | | | |
| $L^*45°$ | 20.11 | 21.94 | 20.67 | 32.6 | 35.59 | 19.35 | 23.38 | 24.16 | 24.17 |
| $a^*45°$ | 23.04 | 28.81 | 33.06 | 17.11 | 19.71 | 26.33 | 27.64 | 30.7 | 36.31 |
| $b^*45°$ | 24.32 | 29.42 | 30.1 | 38.53 | 40.33 | 30.29 | 27.78 | 30.7 | 34.31 |
| $C45°$ | 33.5 | 41.2 | 44.7 | 42.2 | 44.9 | 40.1 | 39.2 | 43.4 | 50.0 |
| $\Delta C45°$ | −11.2 | −3.5 | | 2.0 | 4.8 | | −10.8 | −6.5 | |
| $\Delta L^*45°$ | −0.56 | 1.27 | | 13.25 | 16.24 | | −0.79 | −0.01 | |
| Light Measured at 75° | | | | | | | | | |
| $L^*75°$ | 21.33 | 23.73 | 19.91 | 23.5 | 25.62 | 16.48 | 23.84 | 23.51 | 22.19 |
| $a^*75°$ | 28.87 | 34.55 | 33.49 | 20.47 | 22.75 | 25.67 | 34.23 | 35.09 | 36.36 |
| $b^*75°$ | 29.29 | 34.19 | 28.8 | 33.57 | 36.64 | 25.05 | 33.33 | 33.34 | 34.31 |
| $C75°$ | 41.1 | 48.6 | 44.2 | 39.3 | 43.1 | 35.9 | 47.8 | 48.4 | 50.0 |
| $\Delta C75°$ | −3.0 | 4.4 | | 3.5 | 7.3 | | −2.2 | −1.6 | |
| $\Delta L^*75°$ | 1.42 | 3.82 | | 7.02 | 9.14 | | 1.65 | 1.32 | |
| Light Measured at 110° | | | | | | | | | |
| $L^*110°$ | 19.52 | 21.74 | 18.15 | 23.37 | 23.14 | 16.14 | 22.79 | 22.46 | 21.12 |
| $A^*110°$ | 29.21 | 34.07 | 32.4 | 26.15 | 27.93 | 25.76 | 34.94 | 35.75 | 36.37 |
| $B^*110°$ | 27.2 | 31.32 | 26.22 | 35.95 | 36.07 | 13.87 | 32.21 | 32.35 | 31.12 |
| $C110°$ | 39.9 | 46.3 | 41.7 | 44.5 | 45.6 | 29.3 | 47.5 | 48.2 | 47.9 |
| $\Delta C110°$ | −1.8 | 4.6 | | 15.2 | 16.4 | | −0.3 | 0.3 | |
| $\Delta L^*110°$ | 1.37 | 3.59 | | 7.23 | 7 | | 1.67 | 1.34 | |

Part 2

| | Example | | | | | | | | |
|---|---|---|---|---|---|---|---|---|---|
| | 6 | 7 | 8 | H | I | J | 9 | 10 | 11 |
| Bottle Size | Large | Medium | Small | Large | Medium | Small | Large | Medium | Small |
| Sidewall Thickness (mm) | 0.3048 | 0.4064 | 1.27 | 0.3048 | 0.4064 | 1.27 | 0.3048 | 0.4064 | 1.27 |
| Preform Length (mm) | 82.55 | 82.55 | 82.55 | 82.55 | 82.55 | 82.55 | 82.55 | 82.55 | 82.55 |

TABLE 6-continued

| | | | | | | | | | |
|---|---|---|---|---|---|---|---|---|---|
| Preform Sidewall Thickness (mm) | 3.81 | 3.81 | 3.81 | 3.81 | 3.81 | 3.81 | 3.81 | 3.81 | 3.81 |
| Concentrate Example | 2 | 2 | 2 | A | A | A | 2 | 2 | 2 |
| Concentrate Loading (wt. %) | 1.6 | 1.6 | 1.6 | 1.6 | 1.6 | 1.6 | 2.1 | 2.1 | 2.1 |
| PMP in Sidewall (wt. %) | 0.88 | 0.88 | 0.88 | 0.00 | 0.00 | 0.00 | 1.14 | 1.14 | 1.14 |
| PMP Amount | Medium | Medium | Medium | None | None | None | Large | Large | Large |
| Stretch Ratio (Radial Wall Thickness) | 12.5 | 9.375 | 2.98 | 12.5 | 9.375 | 2.98 | 12.5 | 9.375 | 2.98 |
| Molding Temperature | 307° C. | 307° C. | 307° C. | 307° C. | 307° C. | 307° C. | 307° C. | 307° C. | 307° C. |
| Cycle Time of Molding (secs) | 15 ± 2 | 15 ± 2 | 15 ± 2 | 15 ± 2 | 15 ± 2 | 15 ± 2 | 15 ± 2 | 15 ± 2 | 15 ± 2 |
| Type of Stretch Blow Molding | Two-Stage | Two-Stage | Two-Stage | Two-Stage | Two-Stage | Two-Stage | Two-Stage | Two-Stage | Two-Stage |
| Pressure Range (high-low) (Mpa) | 2.07-1.24 | 2.07-1.24 | 2.07-1.24 | 2.07-1.24 | 2.07-1.24 | 2.07-1.24 | 2.07-1.24 | 2.07-1.24 | 2.07-1.24 |
| Mold Temperature | 10° C. | 10° C. | 10° C. | 10° C. | 10° C. | 10° C. | 10° C. | 10° C. | 10° C. |
| Goniospectrophotometer Measurements from Light at 45° (ASTM D2244) | | | | | | | | | |
| Light Measured at 15° | | | | | | | | | |
| $L*15°$ | 75.26 | 64.83 | 30.98 | 56.45 | 50.02 | 47.46 | 69.11 | 67.79 | 33.73 |
| $a*15°$ | 16.27 | 19.72 | 27.37 | 34.65 | 36.5 | 37.23 | 21.33 | 20.38 | 28.38 |
| $b*15°$ | 56.9 | 48.59 | 31.42 | 30.84 | 36.24 | 37.8 | 57.2 | 46.06 | 33.86 |
| C15° | 59.2 | 52.4 | 41.7 | 46.4 | 51.4 | 53.1 | 61.0 | 50.4 | 44.2 |
| ΔC15° | 17.5 | 10.8 | | −6.7 | −1.6 | | 16.9 | 6.2 | |
| $ΔL*15°$ | 44.28 | 33.85 | | 8.99 | 2.56 | | 35.38 | 34.06 | |
| Light Measured at 25° | | | | | | | | | |
| $L*25°$ | 55.68 | 52.88 | 25.8 | 39.39 | 37.58 | 35.73 | 51.63 | 51.67 | 27.58 |
| $a*25°$ | 17.94 | 21.99 | 28.85 | 34.89 | 37.47 | 37.4 | 23.18 | 25.61 | 30.02 |
| $b*25°$ | 50.8 | 49.72 | 34.39 | 32.63 | 39.24 | 38 | 51.58 | 48.53 | 36.51 |
| C25° | 53.9 | 54.4 | 44.9 | 47.8 | 54.3 | 53.3 | 56.5 | 54.9 | 47.3 |
| ΔC25° | 12.2 | 12.7 | | −5.5 | 0.9 | | 9.3 | 7.6 | |
| $ΔL*25°$ | 29.88 | 27.08 | | 3.66 | 1.85 | | 24.05 | 24.09 | |
| Light Measured at 45° | | | | | | | | | |
| $L*45°$ | 35.49 | 37.86 | 19.79 | 27.98 | 27.03 | 25.67 | 34.15 | 36.05 | 20.55 |
| $a*45°$ | 20.34 | 24.77 | 28.88 | 37.13 | 38.22 | 37.53 | 25.24 | 30.07 | 30.93 |
| $b*45°$ | 43.25 | 47.07 | 31.09 | 35.35 | 37.51 | 36.54 | 45.04 | 49.92 | 32.68 |
| C45° | 47.8 | 53.2 | 42.4 | 51.3 | 53.6 | 52.4 | 51.6 | 58.3 | 45.0 |
| ΔC45° | 6.1 | 11.5 | | −1.1 | 1.2 | | 6.6 | 13.3 | |
| $ΔL*45°$ | 15.7 | 18.07 | | 2.31 | 1.36 | | 13.6 | 15.5 | |
| Light Measured at 75° | | | | | | | | | |
| $L*75°$ | 26.84 | 28.76 | 17.16 | 27.14 | 24.95 | 22.84 | 27.02 | 28.06 | 17.33 |
| $a*75°$ | 23.99 | 28.63 | 28.36 | 41.38 | 40.18 | 36.99 | 28.55 | 33.08 | 31.18 |
| $b*75°$ | 38.89 | 42.9 | 26.14 | 38.7 | 36.35 | 33.08 | 40.8 | 44.04 | 27.09 |
| C75° | 45.7 | 51.6 | 38.6 | 56.7 | 54.2 | 49.6 | 49.8 | 55.1 | 41.3 |
| ΔC75° | 4.0 | 9.9 | | 7.0 | 4.6 | | 8.5 | 13.8 | |
| $ΔL*75°$ | 9.68 | 11.6 | | 4.3 | 2.11 | | 9.69 | 10.73 | |
| Light Measured at 110° | | | | | | | | | |
| $L*110°$ | 26.62 | 26.06 | 14.94 | 25.82 | 24.49 | 21.53 | 27.12 | 25.89 | 15.2 |
| $A*110°$ | 29.34 | 32.17 | 30.07 | 41.56 | 41.14 | 36.77 | 33.64 | 36.22 | 32.27 |
| $B*110°$ | 41.21 | 41.52 | 24.64 | 37.51 | 36.34 | 31.72 | 43.1 | 42.19 | 25.67 |
| C110° | 50.6 | 52.5 | 38.9 | 56.0 | 54.9 | 48.6 | 54.7 | 55.6 | 41.2 |
| ΔC110° | 8.9 | 10.9 | | 7.4 | 6.3 | | 13.4 | 14.4 | |
| $ΔL*110°$ | 11.68 | 11.12 | | 4.29 | 2.96 | | 11.92 | 10.69 | |

The goniospectrophotometer measurements quantify what is immediately apparent from visual examination of the bottles of the Examples compared with the bottles of the Comparative Examples.

The Comparative Examples, selected as among the reasonable commercially available representations of the use of metallic flake pigment concentrates to create a metallic effect in a monolayer polyester bottle, are visibly translucent and have little of the sheen or sparkle that the Examples do. (If one tried to add significantly larger amounts of metallic flake pigments to merely obtain a metallic or pearlescent effect, then one would encounter surface texture problems and a decrease in physical property performance.) The Examples are striking in their brushed metallic appearance. As one moves the angle of the sidewall of the bottle relative to any stationary light source, the change in both chromaticity and brightness is dramatic from a dull bronze to a bright brass for Examples 3, 6, and 9, the bottles with the highest stretch ratio. If more than one stationary light source is present, the combination of angles of reflected light causes the outer surface of the bottles of Example 3, 6, and 9 to dazzle the viewer.

FIGS. 1-9 show the quantitative charts of comparison results. FIGS. 10-16 show photographs of the bottles of the Examples and the Comparative Examples.

Using $L*a*b*$ color theory, brightness ($L*$) was measured, and chromaticity (C) (the square root of the sum of the squares of $a*$ and $b*$) was calculated. Also ΔL and ΔC were calculated for the larger two bottles relative to the smallest of the bottles in each trio of Examples and Comparative Examples. For purposes of analysis, a larger ΔL corresponds to an increased brightness and would indicate a greater metallic or pearlescent reflectivity. The ΔC corresponds to the change in chromaticity, which for the analysis of those examples derived from Example 2 and Comparative Example A, a positive ΔC represents a change towards more red or yellow, or both, and a negative ΔC represents a change towards more green or blue, or both.

A 3×3 matrix of data was generated for small, medium, and large bottle sizes (i.e., stretch ratios) and for small, medium, and large concentrate loadings (with increasing PMP content respectively), with bottles from the matching preforms occupying the center cell of that 3×3 matrix. Both the Comparison Examples and the Examples employed this 3×3 matrix.

FIG. 1 is a graph comparing the change in brightness with the change in thickness between Comparative Examples E and G and Examples 6 and 8, respectively, for each of the five goniospectrophotometer measurements. Though both curves are similar at first viewing, there are significant differences. The higher differential brightness for 15° and 25° for the Comparative Examples is a result of their translucency and a reflection of the background behind the bottle. Examples 6 and 8, by comparison were essentially opaque, yet resulted in as much as 45 points increase at 15°. Also significant was the absence of any change in brightness for angles 45°, 75°, and 110° of the Comparative Examples bottles, whereas the change in brightness at those angles for the Example bottles were no less than 10 points throughout all angles of goniospectrophotometer measurement.

It should also be noted that if metallic pigments had not been present in the Comparative Example bottles that there would be no change in brightness at any of the goniospectrophotometer angles. Yet the Comparative Examples still have no change in brightness for the three higher angles and background translucency issues are influencing the results for the two lower angles.

Figure 2:
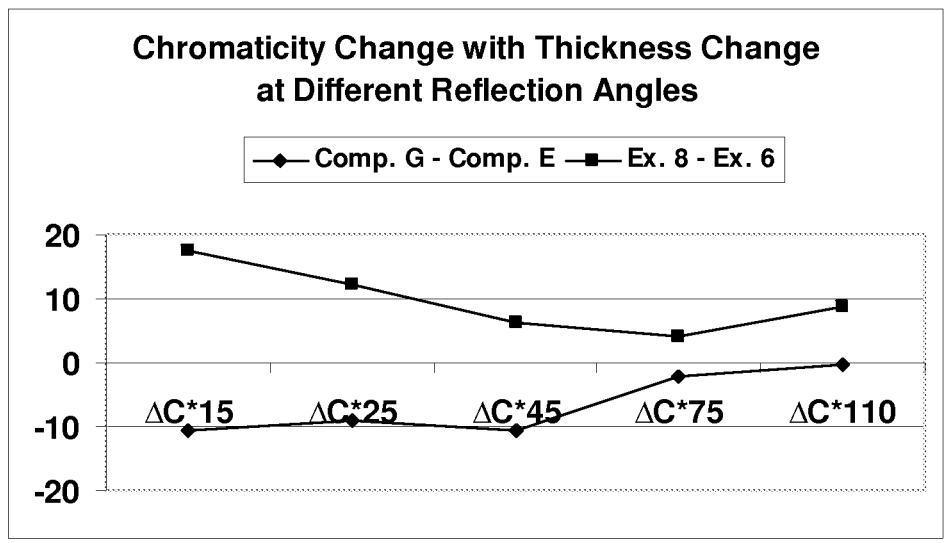
FIG. 2 is a graph of chromaticity change with thickness change at different reflection angles for one pair of Comparison Examples and for one pair of Examples.

FIG. 2 shows the chromaticity change for the same comparison of the same bottles. Significantly, the change in chromaticity at all angles of the Comparative Example bottles was negative, meaning that the color of the bottles at each angle was less red or orange or both for the larger bottle subjected to a higher stretch ratio than the small bottle subjected to a lower stretch ratio. Only at 110° is the chromaticity nearly the same.

Totally differently, the change in chromaticity for Bottle 8 less Bottle 6 at all angles was positive, meaning that at each angle the larger bottle subjected to the higher stretch ratio was more red or orange or both.

Considering the combination of the graphical results of both Brightness Change and Chromaticity Change, Example 8 was strikingly more lustrous and metallic in appearance than Example 6, at all angles of goniospectrophotometer measurement, whereas Comparison Example G vs. Comparison Example E was not. Particularly, at angles of 45°, 75°, and 110°, Comparison Example G showed no brightness change, a chromaticity change toward blue and green, or both.

Figure 3:
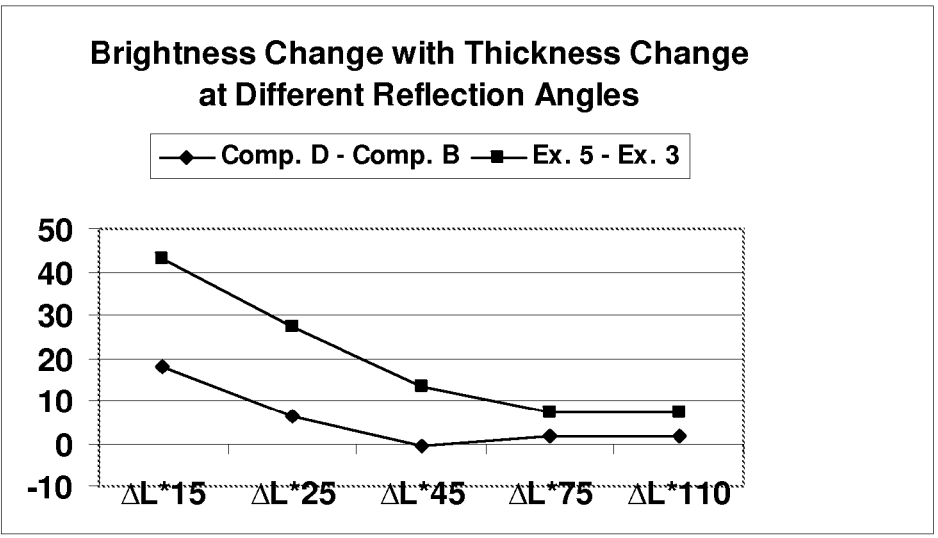
FIG. 3 is a graph of brightness change with thickness change at different reflection angles for another pair of Comparison Examples and for another pair of Examples.
Figure 4:
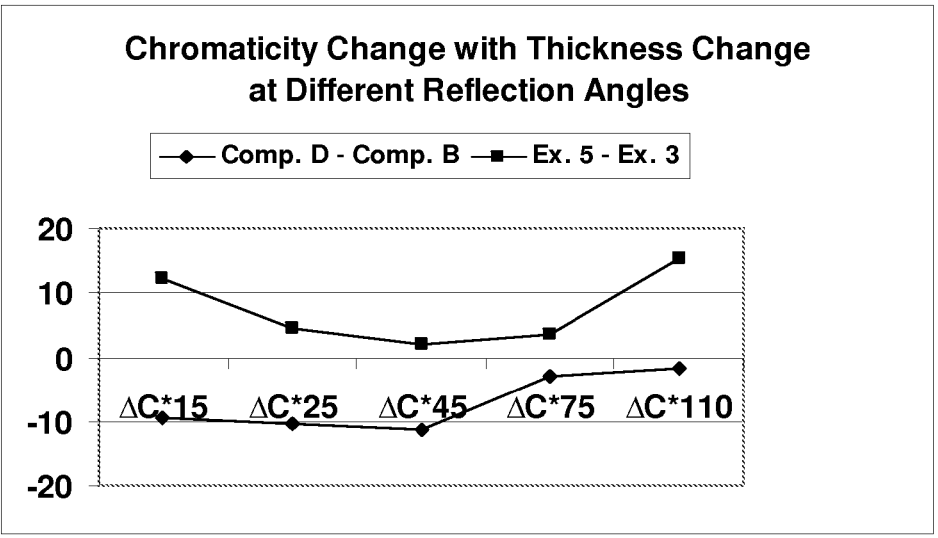
FIG. 4 is a graph of chromaticity change with thickness change at different reflection angles for another pair of Comparison Examples and for another pair of Examples.

FIG. 3 shows the brightness changes for the lower concentrations of colorants in the Comparative Examples B and D vs. Examples 3 and 5. FIG. 4 shows the chromaticity changes for those same Comparative Examples and Examples. All that was stated above with respect to FIGS. 1 and 2 can be repeated here. This quantitative analysis of change in brightness and change in chromaticity shows predictable results at a lower concentration of colorant (also known as a higher let down ratio.)

Figure 5:
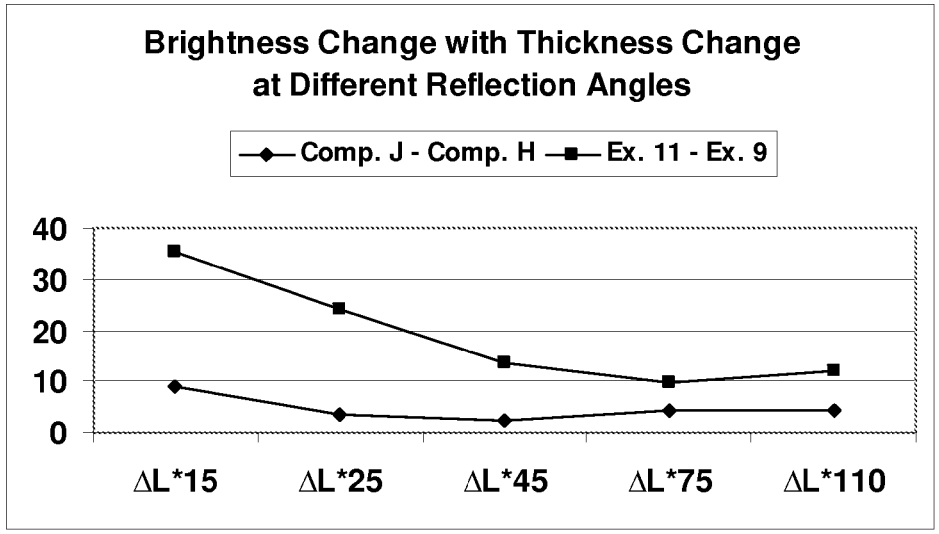
FIG. 5 is a graph of brightness change with thickness change at different reflection angles for a third pair of Comparison Examples and for a third pair of Examples.
Figure 6:
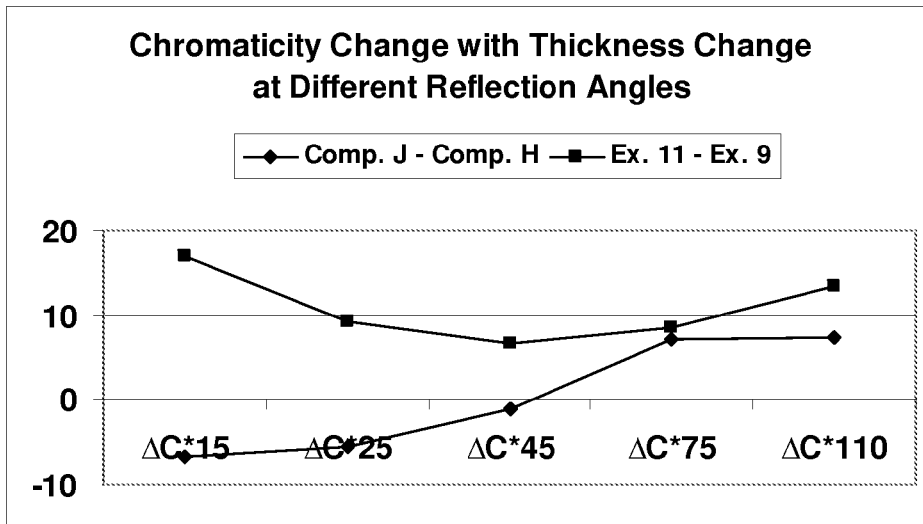
FIG. 6 is a graph of chromaticity change with thickness change at different reflection angles for a third pair of Comparison Examples and for a third pair of Examples.

FIG. 5 shows the brightness changes for the higher concentrations of colorants in Comparative Examples H and J vs. Examples 9 and 11. FIG. 6 shows the chromaticity changes for those same Comparative Examples and Examples. The same trends as seen in FIGS. 1 and 3 and FIGS. 2 and 4, respectively, are generally seen in FIGS. 5 and 6. The variances appear mainly in the Comparative Examples H and J where the higher amount of colorant concentrate (with metallic special effects flakes) begins to result in both a positive brightness change at all angles and a positive chromaticity change (more reddish or yellowish or both) as the last two angles were measured.

It would be expected by one of ordinary skill in the art that increasing loadings of metallic colorant concentrates would increase the change in brightness and the change in chromaticity, if one studied the trends for the Comparative Examples from FIGS. 3, 1, and 5 and FIGS. 4, 2, and 6, respectively. But with increasing concentrations of metallic pigment colorant comes more difficult even dispersion, loss of desired physical performance properties, etc., as explained earlier.

Conversely, and totally unexpectedly, the presence of PMP and conventional non-metallic, non-pearlescent colorants consistently results in an increase in brightness and an increase in chromaticity toward the red and yellow regions of color space. Moreover, the amount of change varies from angle to angle of goniospectrophotometer measurement, meaning that the appearance of metallic reflection is dynamically surprising in appearance.

Figure 7:
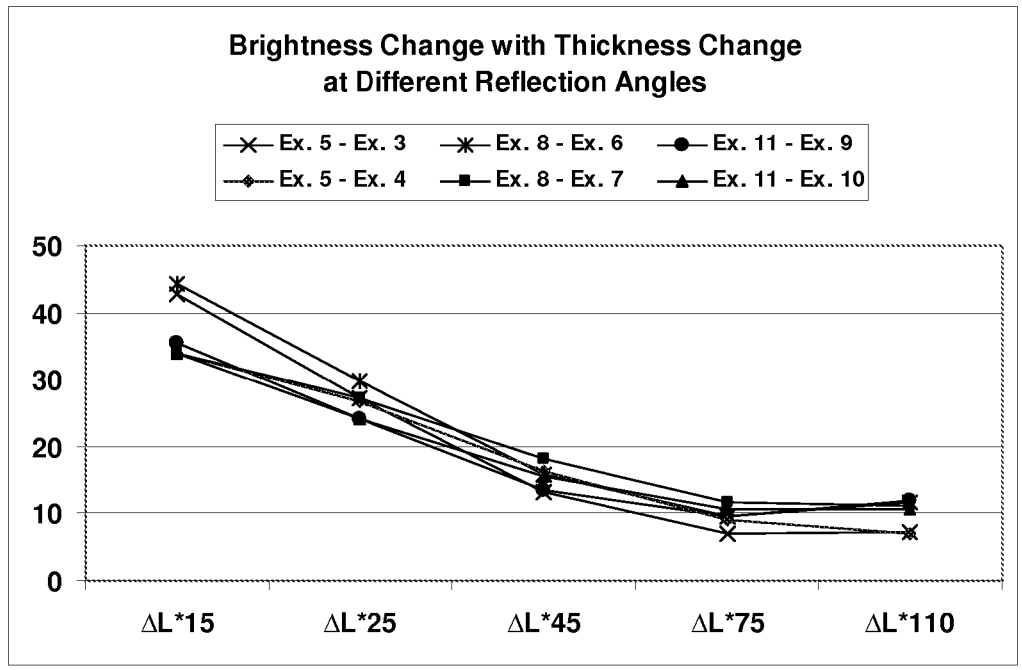
FIG. 7 is a graph of brightness change with thickness change at different reflection angles for six pairs of Examples.
Figure 8:
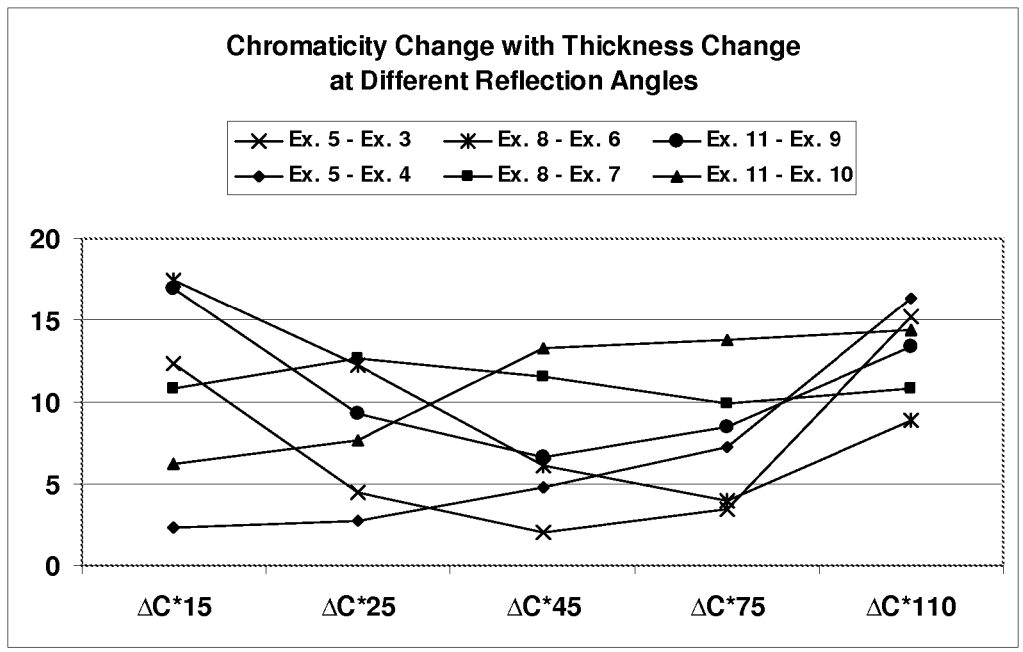
FIG. 8 is a graph of chromaticity change with thickness change at different reflection angles for six pairs of Examples.

FIGS. 1-6 offer a comparison of the largest and smallest bottles, in effect a comparison of the six outer vertical cells of the 3×3 matrix. FIGS. 7 and 8 show, for change in brightness and change in chromaticity, respectively, the comparison at the thickness of the middle-sized bottles with the thickness of the smallest sized bottles and the comparisons of FIGS. 1-6 for the Examples of the invention. The change in brightness is remarkably consistent as the angle of goniospectrophotometer measurement moves from sharp to oblique angles.

From FIG. 7 and the data of Table 6, it is possible to construct ranges of differences in brightness for various visible light goniospectrophotometer measurements for the Examples of the invention. Table 7 shows those results. All numbers are approximate.

TABLE 7

| Angle | 15° | 25° | 45° | 75° | 110° |
|---|---|---|---|---|---|
| ΔL* | 35-45 | 25-30 | 12-20 | 8-12 | 8-12 |

From FIG. 8 and the data of Table 6, it is possible to construct ranges of differences in chromaticity for various goniospectrophotometer measurements for Examples of the invention. Table 8 shows the results in which the differences in chromaticity are segregated between the largest-smallest bottles and the middle-sized and smallest bottles. All numbers are approximate.

TABLE 8

| Angle | 15° | 25° | 45° | 75° | 110° |
|---|---|---|---|---|---|
| ΔC (large-small) | 12-17 | 4-12 | 2-8 | 4-9 | 9-15 |
| ΔC (medium-small) | 2-12 | 3-13 | 5-14 | 7-14 | 10-16 |

While the trends for chromaticity change among Examples 3-11 are less pronounced, it can be viewed that the variability of the chromaticity differences enhances the unexpectedness of coloration at the same time the consistent variation in brightness results in the simulation of a metallic surface or a pearlescent surface on the polyester bottles.

Examples 12-13 and Translucency

Opacity Range

One reason that the invention results in a metallic or pearlescent appearance is the decrease in transparency with the increase in PMP content in the sidewall of the polyester part. Table 9 shows the percentage transmission of the sidewalls of large bottle Comparative Examples B, E, H, and large bottle Examples 3, 6, 9 from earlier and large bottle Examples 12 and 13. Table 9 also shows the percentage transmission of the sidewalls of medium bottle Comparative Examples B, E, H, and medium bottle Examples 3, 6, 9 from earlier and medium bottle Examples 12 and 13. Examples 12 and 13 were made in the same way as Example 3 but have 0.4 weight percent of Example 2 and 0.8 weight percent of Example 2, respectively. Likewise, Examples 14 and 15 were made in the same way as Example 4 but have 0.4 weight percent of Example 2 and 0.8 weight percent of Example 2, respectively.

TABLE 9

| Example | Concentrate (Wt. %) | Additive Type | Additive Amount (Wt. %) | Transmission (Ave. of 5) (%) |
|---|---|---|---|---|
| 12 | 0.4 | PMP | 0.22 | 58.1 |
| 13 | 0.8 | PMP | 0.44 | 30.0 |
| 3 | 1.1 | PMP | 0.61 | 14.8 |
| 6 | 1.6 | PMP | 0.88 | 7.4 |
| 9 | 2.1 | PMP | 1.16 | 3.8 |
| B | 0.8 | Mica | 0.10 | 27.8 |
| E | 1.2 | Mica | 0.15 | 21.2 |
| H | 1.6 | Mica | 0.20 | 15.2 |
| 14 | 0.4 | PMP | 0.22 | 62.82 |
| 15 | 0.8 | PMP | 0.44 | 46.16 |
| 4 | 1.1 | PMP | 0.61 | 19.5 |
| 7 | 1.6 | PMP | 0.88 | 14.6 |
| 10 | 2.1 | PMP | 1.16 | 7.82 |
| C | 0.8 | Mica | 0.10 | 23.36 |
| F | 1.2 | Mica | 0.15 | 16.86 |
| I | 1.6 | Mica | 0.20 | 10.86 |

Figure 9:
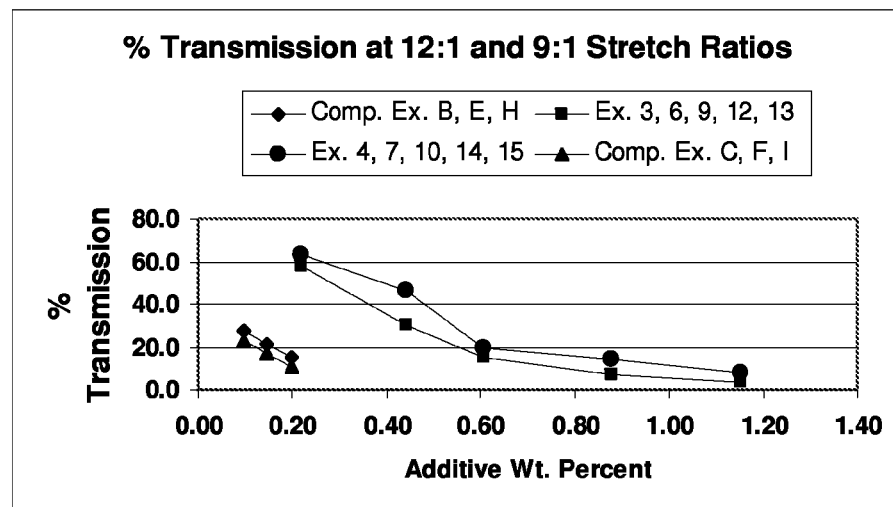
FIG. 9 is a graph of relative opacity for 5 Examples and 3 Comparative Examples.

The true comparison for relative opacity is the amount of the additive affecting transmission. Therefore, Table 9 shows the Additive Type and the Additive Amount in weight percent to the total compound. The lowest percentage of PMP (shared by Examples 12 and 14) is still higher than the highest percentage of Mica (Comparative Example H). FIG. 9 shows the data graphically and demonstrates that a person having ordinary skill in the art can adjust the relative opacity of the simulated metallic or pearlescent surface appearance by adjusting the amount of PMP in the concentrate for use in the final compound or directly into the final compound. As shown in FIG. 9, the range of translucency-opacity can be tailored between 60% and 5% according to the design needs of the customer. It should be noted that as relative opacity increases so does the intensity of the metallic or pearlescent simulation because of the increase in ΔL and ΔC caused by the combination of the presence of PMP and the non-metallic, non-pearlescent colorants.

That such a small amount of PMP (less than 1.5 weight percent) present with non-metallic, non-pearlescent colorants can simulate such an intense metallic or pearlescent surface appearance is truly unexpected from the art. The art had recognized that polyolefins can affect light transmission and haze but not the transformation of a non-metallic colorant into a metallic simulation or a non-pearlescent colorant into a pearlescent simulation.

Stated another way, it may become possible without undue experimentation for a person having ordinary skill in the art to use PMP as a functional additive in any concentrate for use in making polyester articles of all shapes and sizes. From Table 9 and FIG. 9, it can be seen that the various PMP concentrations provide any possible combination of relative opacity and simulated metallic or pearlescent appearance.

Also, from Table 9 and FIG. 9, it can be seen that the results for large and medium bottles for the Comparative Examples behave differently than the results for the large and medium bottles for the Examples. The Comparative Examples have a consistently higher percentage transmission at the higher stretch ratios (equating to a thinner polyester part sidewall) than at the lower stretch ratios: Comparative Examples B-E-H vs. C-F-I. This higher percentage transmission as the wall thins is expected from conventionally colored polyester articles.

The exact opposite occurs for Examples 4-7-10-14-15 vs. 3-6-9-12-13. Those bottles of Examples 3-6-9-12-13 stretched more to result in a thinner polyester part sidewall have a lower percentage transmission of light than the bottles of Examples 4-7-10-14-15.

Moreover, the presence of colorants (Table 4) has very little effect on the various Examples in Table 9 and FIG. 9; the unexpected result of percentage transmission comes from the loading of PMP in the polyester sidewall of article and the stretch ratio employed.

No matter how many data points, tables, charts and explanations are presented, they pale in comparison to the qualitative viewing the bottles themselves. FIGS. 10-16 provide those views.

Figure 10:
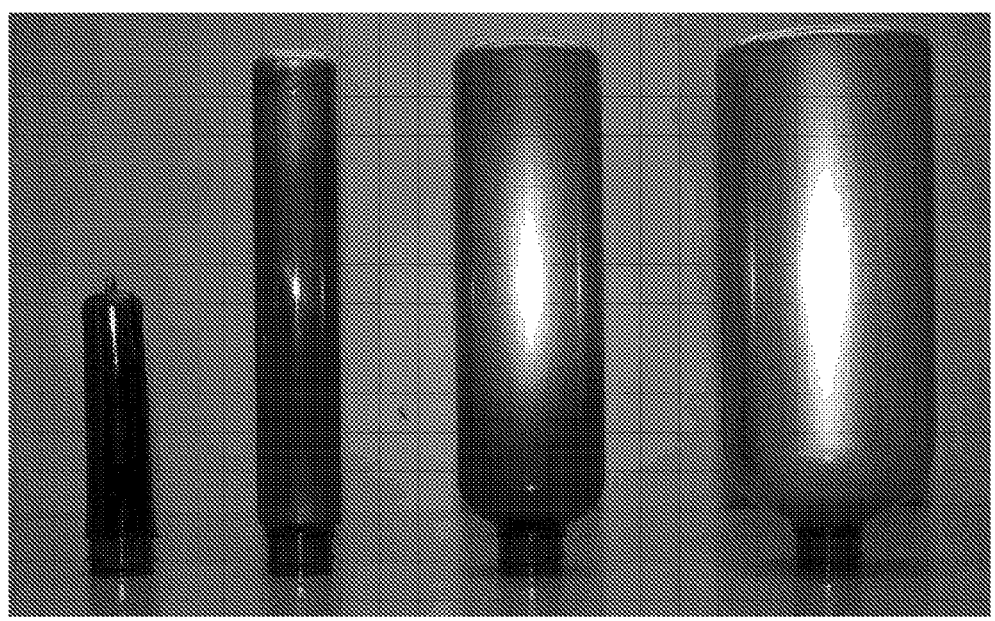
FIG. 10 is a photo of Examples 3-5 with their preform.
Figure 11:
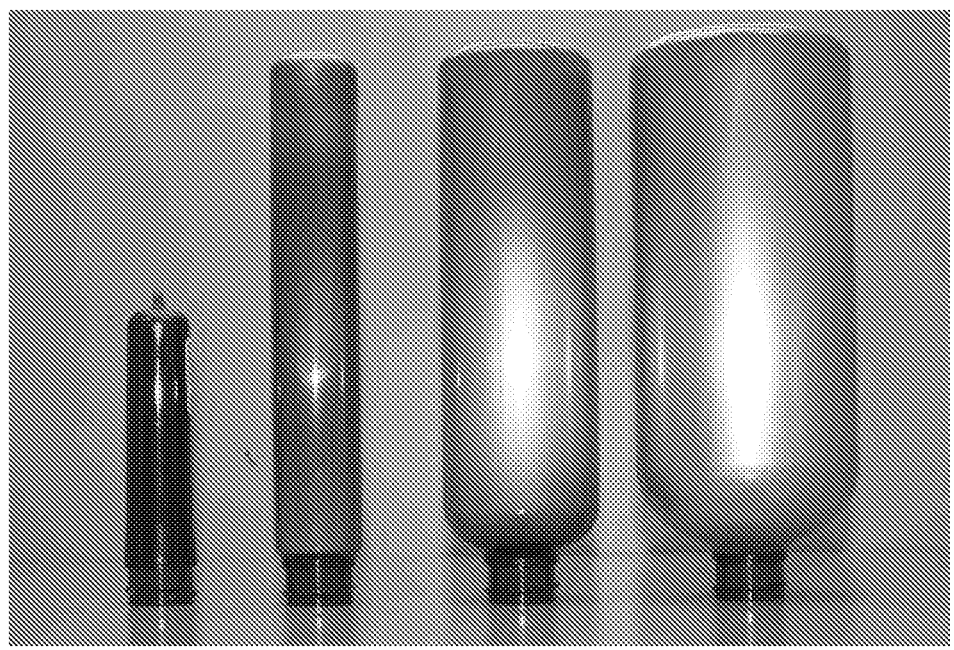
FIG. 11 is a photo of Examples 9-11 with their preform.

FIG. 10 is a photograph, from right to left, of Examples 3-5 and the preform from which Examples 3-5 were stretch blow molded. FIG. 11 is a photograph, from right to left, of Examples 9-11 and the preform from which Examples 9-11 were stretch blow molded. The progressive increase in metallic appearance at constant PMP content from a stretch ratio of about 3 to about 12.5 is dramatic and exciting. It is difficult to believe that no metallic colorant or pearl colorant is present in Examples 3-5 or 9-11. The very dull preform dazzles when stretched due to less than 1.2 weight percent of PMP present in the polyester.

Figure 12:
FIG. 12 is a photo of Comparative Examples B-D with their preform.
Figure 13:
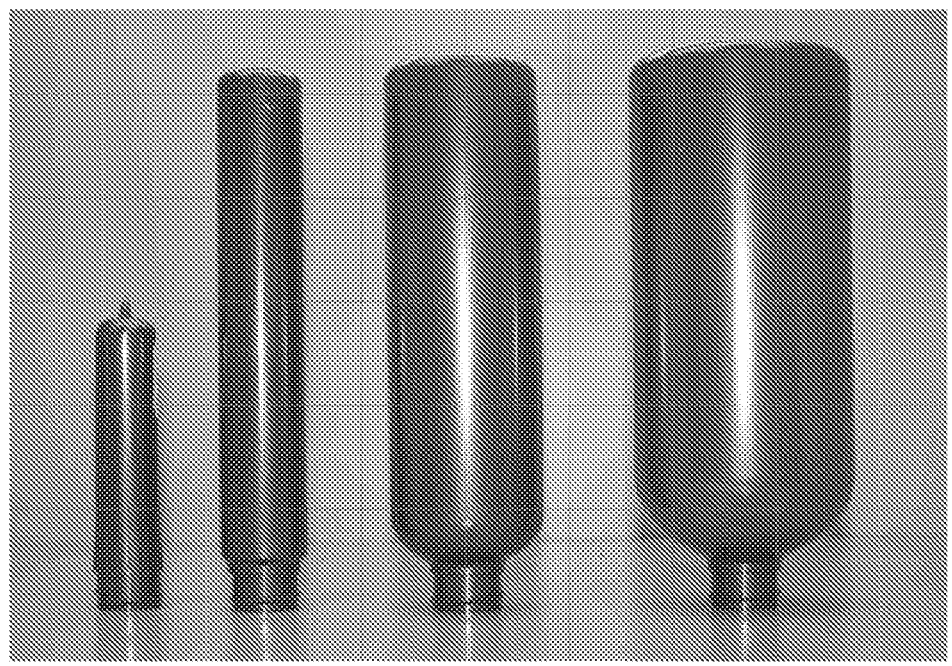
FIG. 13 is a photo of Comparative Examples H-J with their preform.

FIG. 12 is a photograph, from right to left, of Comparative Examples B-D with their preform while FIG. 13 is a photograph, from right to left, of Comparative Examples H-J with their preform. While these Comparative Examples represent the current best metallic appearance formulations possible, and while they are attractive in appearance, it is also easy to see that they do not have anywhere near the dazzling appearance of Examples 3-5 and 9-11.

Figure 14:
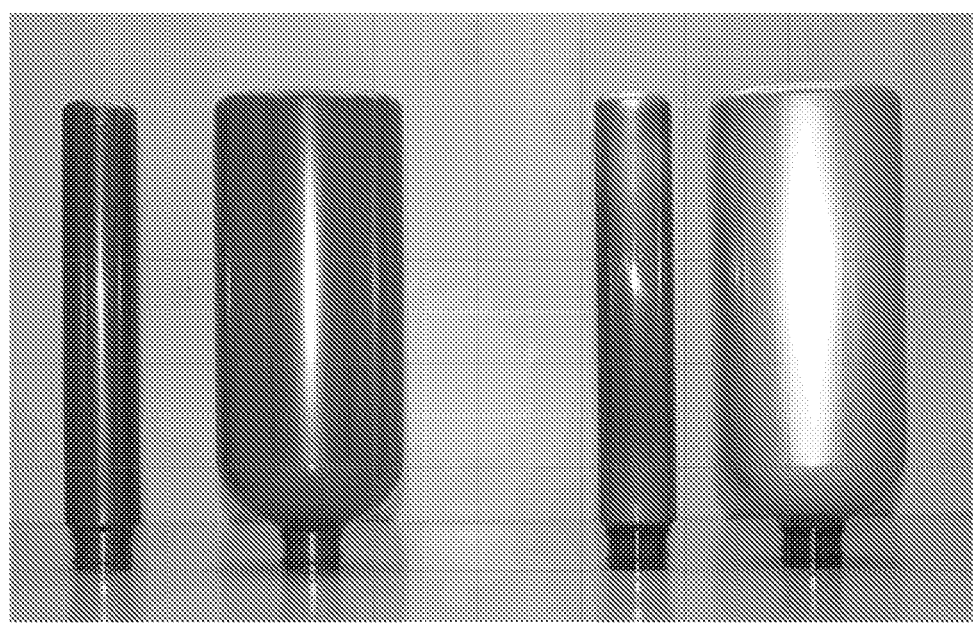
FIG. 14 is a photo comparing Comparative Examples E and G with Examples 6 and 8.

FIG. 14 is a photographic lineup, from left to right, of Comparative Examples G and E and Examples 8 and 6, upon which Tables 7 and 8 were constructed. The golden sheen of Example 6 at the far right, compared with Comparative Example E at center left, is totally unexpected and strikingly beautiful.

Figure 15:
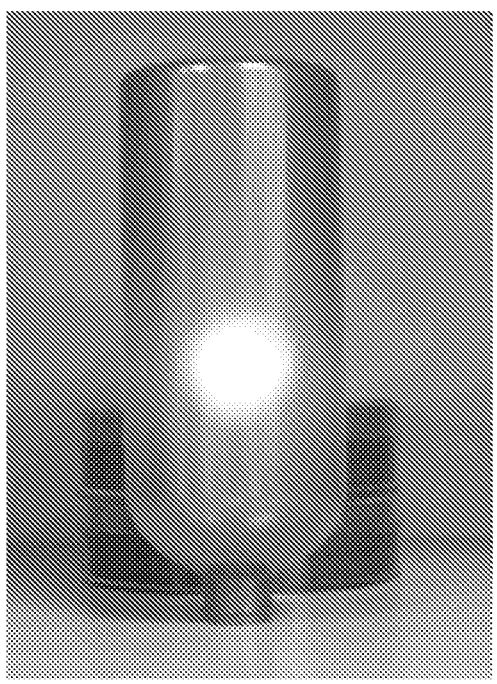
FIG. 15 is a photo of Comparative Example E with a flashlight opposite the viewer.
Figure 16:
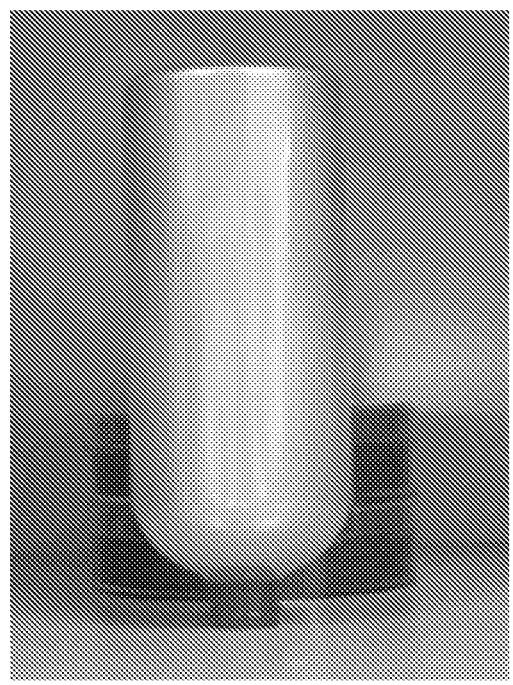
FIG. 16 is a photo of Example 6 with a flashlight opposite the viewer.

FIG. 15 is a photograph of Comparative Example E, and FIG. 16 is a photograph of Example 6. Both bottles have a 15 lumen flashlight placed about 180° opposite of the viewer's perspective. The relative opacity (21.2% transmission for Comparative Example E vs. 7.4% transmission for Example 6) is visually and strikingly demonstrated. Because many consider the threshold of opacity to be less than 20% light transmission or even 10%, the relative opacity plus metallic outer appearance of the bottle can be achieved via Example 6.

Figure 17:
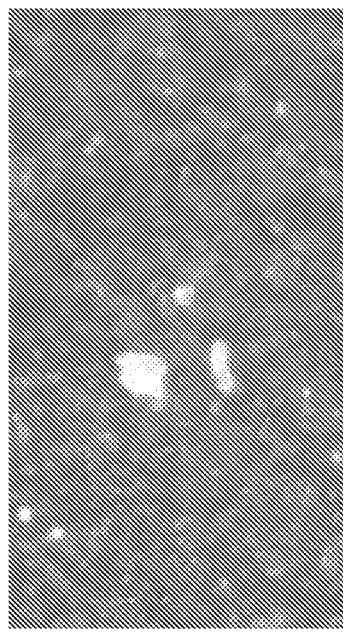
FIG. 17 is a photomicrograph at 40× magnification of Comparative Example E.
Figure 18:
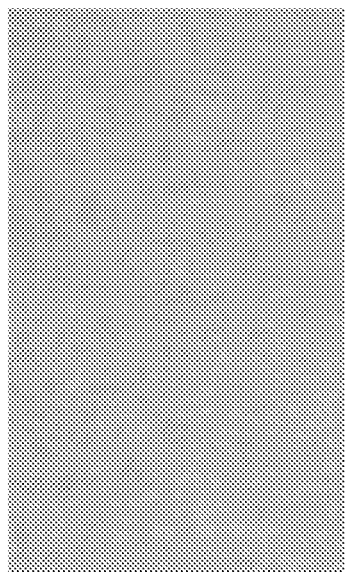
FIG. 18 is a photomicrograph at 40× magnification of Example 6.

FIG. 17 is a photomicrograph of the sidewall surface of Comparative Example E using a stereo optical microscope at 40 times magnification with a light shining on its surface. FIG. 18 is a photomicrograph of the sidewall surface of Example 6 at the same 40 times magnification using the same microscope and the same light at the same angle. In FIG. 17, flakes of mica pigment are clearly visible with one of them even reflecting back the incident light. The mottled uneven appearance is indicative of the presence of the mica pigments which are used for metallic or pearlescent effect. In FIG. 18, the PMP present is indiscernible, and the appearance is one of a smooth shiny surface, just what the simulated metallic surface is in the above Figs. of the present invention.

Considering all photograph FIGS. 10-18, an aspect of the invention arises from the combination of the increase in chromaticity (a vector from the scalars of the x and y dimensions) and the increase in brightness (the z dimension) which give the increasing appearance of simulated metallicity at any one angle of light reflected. Because the brightness changes differently than the chromaticity throughout the goniospectrophotometer angles, the eye believes it is seeing a shiny copper metal, almost gold at one extreme and almost dull bronze at the other.

The effect of PMP and non-metallic, non-pearlescent colorants is not limited to a copper or gold metallic appearance. Bottles were also made using the concentrate of Example 1 and let down into polyester such that the PMP concentration ranged from 0.23 weight percent to 1.2 weight percent. A lustrous gray metallic simulation was achieved with percent visible light transmission ranging from 46% to 1.8%, respectively.

An entirely new approach to employing conventional non-metallic, non-pearlescent colorants to simulate a metallic or pearlescent surface in a stretch blow molded bottle has been achieved. Unexpectedly, the use of one type of thermoplastic resin, PMP, with the use of conventional colorants in polyester and stretch blow molded into a bottle gives that bottle an appearance that looks as if it were made of metal or mother-of-pearl.

With the variables of simulation understood, a person having ordinary skill in the art can use to data from Tables 6-9 and the charts of FIGS. 1-9 to make plastic articles of various thicknesses using a constant colorant concentration, plastic articles of constant thickness using various stresses or various colorant concentrations, etc. What will result are the beautiful bottles of FIGS. 10, 11, 14 (right side), and 16.

Once the visual dazzle of the present invention is known by reviewing the Examples, the Tables, and the photographs, one having ordinary skill in the art can create all different combinations of polyester articles having the benefit of the invention. One could utilize multiple different concentrates, all containing PMP but in different amounts. One could utilize multiple different concentrates, at least one containing PMP and at least one not. By complex molding techniques, one could have a simulated metallic or pearlescent surface on the polyester article for only one region of the article and a different simulated metallic or pearlescent surface or a conventional colorant or a special effects colorant or both in another region or additional regions of the same article. The possibilities are endless.

The molded plastic article can be made by other molding techniques. The molded plastic article can be used for any purpose imaginable. Any molded polyester article which utilizes a calculable wall thickness can benefit from the explanations in this invention to achieve any desired level of simulated metallic or pearlescent appearance. Using the range of 1.5%/mm-1.55%/mm of weight percent of PMP per millimeter of wall thickness, the invention can be employed in endless situations.

With this knowledge, a person having ordinary skill in the art, without undue experimentation, can engineer a variety of plastic article shapes using stretch blow molding manufacturing or other stress-inducing formation techniques in order to produce beautiful metallic or pearlescent appearances from conventional colorants.

The invention is not limited to the above embodiments. The claims follow.

What is claimed is:

1. A plastic article, comprising:
(a) a matrix of polyester and
(b) polymethylpentene dispersed throughout the matrix, and
(c) at least one non-metallic, non-pearlescent colorant dispersed throughout the matrix, wherein surfaces of the article have a brightness and chromaticity which simulates the appearance of metallic pigment or pearlescent pigment throughout the matrix because the brightness and chromaticity values change as the angle of the surface of the article changes relative to a constant light source.

2. The article of claim 1,
wherein the article has a wall thickness;
wherein polymethylpentene is 4-methylpentene-1 based polyolefin having a formula I:

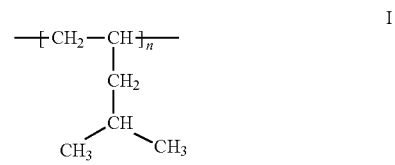

in which n is high enough for the polymer to have a weight average molecular weight higher than the weight average molecular weight of an oligomer; and
wherein the amount of polymethylpentene in the plastic article, as a function of plastic article wall thickness can range from about 0.1 to about 2 weight percent of the plastic article for a plastic article having a wall thickness ranging from about 0.1 to about 2.5 mm in thickness.

3. The plastic article of claim 2, wherein the amount of polymethylpentene ranges from about 0.2 to about 1.5 weight percent of the plastic article for a plastic article having a wall thickness ranging from about 0.1 to about 2.5 mm in thickness.

4. The plastic article of claim 2, wherein a ratio of weight percentage of polymethylpentene to the weight of the plastic article to millimeter of wall thickness of the plastic article ranges from about 0.04%/mm to about 20%/mm.

5. The plastic article of claim 1, wherein the plastic article is a stretch blow molded plastic article formed from a parison or preform and undergoing expansion at a stretch ratio of ranging from about 1.5:1 to about 200:1.

6. The plastic article of any of claim 5, wherein the stretch ratio ranges from about 3:1 to about 50:1.

7. The plastic article of claim 6, wherein the plastic article expands from the parison or preform in a longitudinal expansion ratio of from about 1:1 to about 200:1.

8. The plastic article of claim 1, wherein the at least one colorant can be a pigment, a dye, a combination of pigments, a combination of dyes, a combination of pigments and dye, a combination of pigment and dyes, or a combination of pigments and dyes.

9. The plastic article of claim 1, wherein the polyester comprises a terephthalate, terephthalate glycol, lactide, and (hydroxy)alkanoate, and copolyester of terephthalic acid residues, 2,2,4,4-tetramethyl-1,3-cyclobutanediol, and 1,4-cyclohexanedimethanol, or combinations thereof.

10. The plastic article of claim 1, wherein the article further comprises an anti-oxidant, an anti-stat, an acetaldehyde scavenger, an oxygen scavenger, a blowing agent, a biocide, an exfoliated nanoclay, a thickener, a special effect feature, or combinations thereof.

11. The plastic article of claim 5, wherein, under visible light goniospectrophotometry of the plastic article, an increase in differential brightness ($\Delta L^*$) and an increase in differential chromaticity ($\Delta C$) result.

12. The plastic article of claim 11, wherein increase in brightness under the visible light goniospectrophotometry at various angles, and having a stretch ratio of from about 3:1 to about 12:1, is in the range of:

| Angle | 15° | 25° | 45° | 75° | 110° |
|---|---|---|---|---|---|
| $\Delta L^*$ | 35-45 | 25-30 | 12-20 | 8-12 | 8-12. |

13. The plastic article of claim 12, wherein increase in chromaticity under the visible light goniospectrophotometry at various angles is in the range of:

| Angle | 15° | 25° | 45° | 75° | 110° |
|---|---|---|---|---|---|
| $\Delta C$ | 12-17 | 4-12 | 2-8 | 4-9 | 9-15. |

14. The plastic article of claim 1, wherein relative opacity of the plastic article can range from about 60% visible light transmission to about 2% visible light transmission.

15. The plastic article of claim 1, wherein the polymethylpentene and the at least one colorant enter the matrix of the polyester in the form of a concentrate, wherein the concentrate consists essentially of the polymethylpentene as a carrier and the at least one non-metallic, non-pearlescent colorant mixed into the carrier, and wherein the colorant has a concentration of about 0.01 to about 75 weight percent of the concentrate.

16. A method of making the plastic article of claim 15, comprising the steps of:
(a) mixing the matrix and the concentrate into a mixture; and
(b) forming under stress the mixture into the plastic article, wherein the differences in brightness and chromaticity are a function of the amount of polymethylpentene in the mixture and the stretch ratio to reduce wall thickness during the stretch blow molding step.

17. The method of claim 16, wherein the molding step includes reduction in the wall thickness in a range of about 1.5:1 to about 200:1.

18. The method of claim 17, wherein the molding step also includes expansion in length of about 1:1 to about 200:1.

19. The method of claim 16, wherein between step (a) and step (b), molding of a parison occurs followed nearly immediately by step (b) in a one stage process.

20. The method of claim 16, wherein between step (a) and step (b), molding of a preform occurs followed later by step (b) in a two stage process.

* * * * *